United States Patent [19]
Menzin et al.

[11] 3,752,619
[45] Aug. 14, 1973

[54] PRODUCTION OF A CONTINUOUS MOLDED PLASTIC STRIP

[75] Inventors: Marvin Menzin, Waltham; John H. Blanz, Concord; Andrew C. Harvey, Boston; Sang Soon Rhee, Burlington, all of Mass.

[73] Assignee: American Velcro Inc., New York, N.Y.

[22] Filed: Nov. 11, 1971

[21] Appl. No.: 198,002

Related U.S. Application Data

[62] Division of Ser. No. 824,597, May 14, 1969, abandoned.

[52] U.S. Cl.................... 425/134, 425/246, 425/441
[51] Int. Cl............................................... B29f 1/14
[58] Field of Search................... 18/20 H, 21, 30 Z, 18/30 PM, 30 PR, 30 PQ, DIG. 58; 264/167, 171, 257, 251; 425/224, 242, 246, 134, 441

[56] References Cited
UNITED STATES PATENTS
| | | | |
|---|---|---|---|
| 3,196,490 | 7/1965 | Erb | 18/21 |
| 2,932,855 | 4/1960 | Bartlett et al. | 264/171 |
| 3,034,177 | 5/1962 | Hooper | 18/42 D |
| 3,509,603 | 5/1970 | Halsall et al. | 18/DIG. 10 |
| 3,507,010 | 4/1970 | Daleman et al. | 18/21 |
| 2,282,308 | 5/1942 | Dahlin | 18/20 H |
| 2,865,046 | 12/1958 | Bird | 264/257 X |

FOREIGN PATENTS OR APPLICATIONS
197,542    8/1965    Sweden

*Primary Examiner*—J. Spencer Overholser
*Assistant Examiner*—David S. Safran
*Attorney*—Dean S. Edmonds, David J. Toomey et al.

[57] ABSTRACT

A continuous molded plastic strip is produced using mold plates which have cavities therein for molding upstanding members or pile-like formations when moldable plastic material is applied under suitable pressure. Thereafter, plastic material is applied to the exposed ends of the pile-like formations while still in the cavities and a strip constituting a base member is formed having the pile-like protuberances integrally attached.

In addition to the apparatus a special method is proposed for producing the upstanding formations or members integrally attached to the base member.

Certain related products are also proposed including a special form of hook member.

21 Claims, 15 Drawing Figures

INVENTORS
MARVIN MENZIN
JOHN H. BLANZ
ANDREW C. HARVEY
SANG SOON RHEE

ATTORNEYS

INVENTORS
MARVIN MENZIN
JOHN H. BLANZ
ANDREW C. HARVEY
SANG SOON RHEE

BY Pennie, Edmonds, Morton, Taylor and Adams
ATTORNEYS

Patented Aug. 14, 1973

INVENTORS
MARVIN MENZIN
JOHN H. BLANZ
ANDREW C. HARVEY
SANG SOON RHEE

BY
ATTORNEYS

INVENTORS
MARVIN MENZIN
JOHN H. BLANZ
ANDREW C. HARVEY
SANG SOON RHEE

BY Rennie, Edmunds, Morton
Taylor and Adams
ATTORNEYS

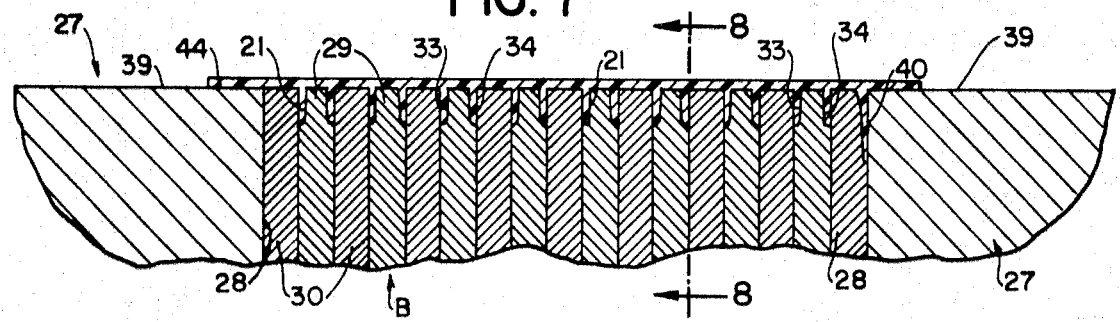
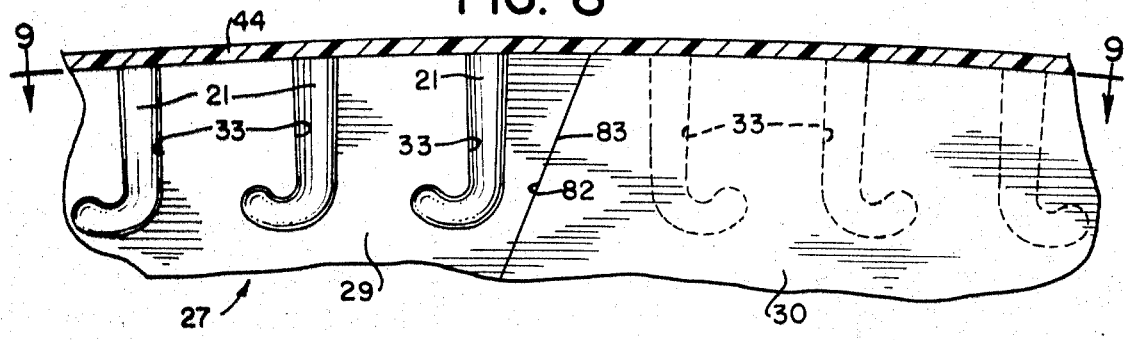
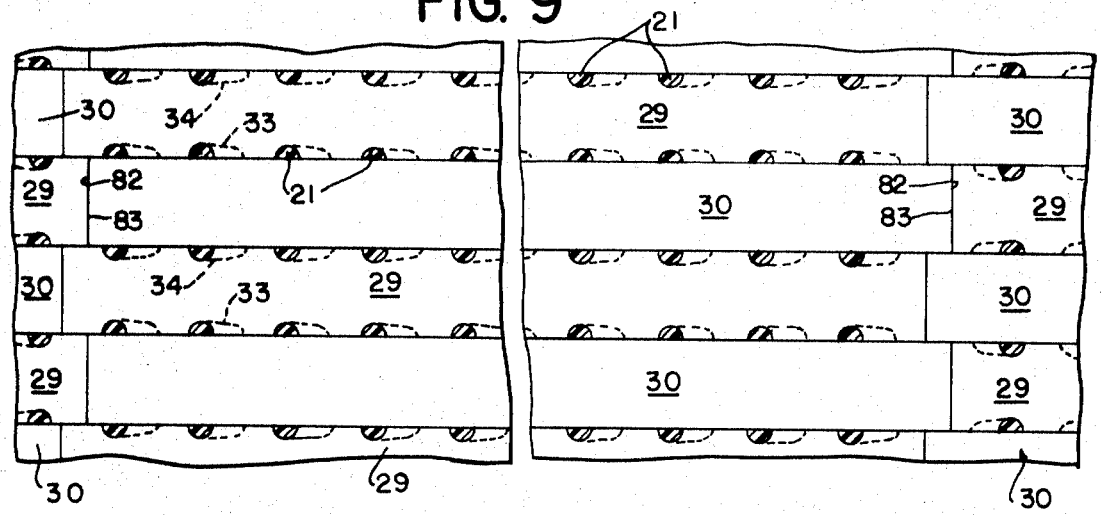

Patented Aug. 14, 1973

INVENTORS
MARVIN MENZIN   ANDREW C. HARVEY
JOHN H. BLANZ   SANG SOON RHEE

BY *Pennie Edmonds, Morton Taylor and Adams*

ATTORNEYS

PRODUCTION OF A CONTINUOUS MOLDED PLASTIC STRIP

This is a divisional application of our copending U.S. application Ser. No. 824,597, filed May 14, 1969, now abandoned.

BACKGROUND OF THE INVENTION

1. Field of the Invention

The invention relates to the manufacture of a molded product which may for example, be in the form of a continuous molded ribbon or other base member having thereon closely spaced upstanding pile-like members or projections in the form of hooks, loops or knob-ended formations and which may be used in making separable fastening devices of the general type disclosed in U.S. Pat. No. 2,717,437 to De Mestral.

2. Description of the Prior art

U.S. Pat. No. 3,196,490 to Erb discloses an apparatus for making a somewhat similar molded product although in that patent the base member is a reinforcing strip of woven fabric and the moldable plastic material is forced through the fabric from one side to the other in forming the pile-like formations or protuberances. Also the apparatus of that patent employs mold plates which are moved in a direction transversely of their widths, whereas in the present apparatus the plates are moved in a lengthwise direction rather than transversely. Furthermore in the patented apparatus the mold plates are separated from one another during a considerable extent of the circular path in which they travel, and are brought together in tightly squeezed face-to-face relation during the remainder of such circular path and during the molding operation.

SUMMARY OF THE INVENTION

In accordance with the present invention and a particular embodiment thereof, mold plates having similar edges are placed side by side in groups and are held in position to form a continuous surface. Mold cavities for molding upstanding projections which may be in the form of hooks, loops, knob-like or other forms, are provided in the faces of the mold plates at their peripheries, these cavities being each closed on one side by the continuous flat surfaces of the adjacent plates. Provision is made for shifting the plates which close the mold cavities radially inward at the proper time so as to open the mold cavities and release the molded upstanding members. Means is provided for delivering moldable plastic material under suitable pressure to the mold cavities and thereby mold the projections, and also such material is delivered to said continuous surface to form thereon a base member strip to which these upstanding members are integrally attached.

Advantageously spacer plates are arranged alternately with the mold plates, the spacer plates serving to close the mold cavities, and the invention will be described with the groups of mold plates arranged in this manner, the groups of plates being held in position sidewise by the walls of a peripheral groove in a disc member which supports the mold plates so that they form a continuous, cylindrical surface. The head of an extruder for plastic material cooperates with the cylindrical surface of the mold wheel thus formed. A molten plastic material from the extruder is forced into the mold cavities under pressure and forms the protuberances, and such material also forms a base member or ribbon on the surface of the mold wheel to which the molded protuberances cast in the mold cavities are integrally connected. An appropriate molten material is Nylon or a material known and sold under the registered tradename "Zytel".

The mold plates containing the mold cavities and the spacer plates are arranged in groups or sets in substantially end-to-end relation extending circumferentially around the peripheral groove in the supporting disc. This disc is arranged in integral relation to a heavy rotatable shaft suitably supported in the frame of the machine and rotated at a comparatively slow speed of from about 6 to 16 revolutions per minute.

Both the mold plates and the spacer plates of each set or group have arcuate outer surfaces and the mold plates are mounted in fixed position with respect to the supporting disc with their arcuate surfaces even with the cylindrical edges of the disc on each side of the groove.

The cooperating spacer plates of each set or group of the mold plates when in their outward position, referred to previously, have their arcuate edges in alignment with the similar edges of the mold plates. In their withdrawn position the edges of the spacer plates are radially inward from the mold cavities so that the pile-like protuberances can be readily freed from these cavities. Mechanism is provided for shifting each set or group of spacer plates radially inward for the purpose just referred to To accomplish such shifting hydraulic means is provided to continuously urge each group of spacer plates radially outward and cams cooperate with rollers mounted on spacer plate shifter elements on the opposite sides of the mold wheel to move the spacer plates inwardly against the hydraulic pressure. By the cooperation of the hydraulic pressure means and the cams the spacer plates are placed and maintained in the outward position during the molding operation, that is, as each set of mold and spacer plates passes the die of the extruder. The spacer plates are in the same way maintained in their outward position for a sufficient length of time after passing the die to allow the moldable material to set. The molded strip with the pile-like protuberances projecting therefrom is led away from the mold wheel approximately on the opposite side thereof from the extruder die.

The continuous molded plastic product may be produced by injection molding a multiplicity of individual upstanding members or formations which may be pile-like in character. These formations are maintained in a predetermined arrangement until after the material has set and then an extrudate of moldable plastic material is applied to the bottom of these members to form the base support for them and to which they are integrally attached.

The invention also includes the product made according to the method above described, together with a special form of hook member which can be molded easily.

BRIEF DESCRIPTION OF THE DRAWINGS

FIG. 7 is a greatly enlarged fragmentary longitudinal section taken on line 7—7 of FIG. 2 with the spacer plates in their outward position;

FIG. 8 is a still further enlarged fragmentary section taken on line 8—8 of FIG. 7.

FIG. 9 is a section taken on line 9—9 of FIG. 8 showing portions of several spacer and mold plates;

DESCRIPTION OF THE PREFERRED EMBODIMENT

Figure 12:
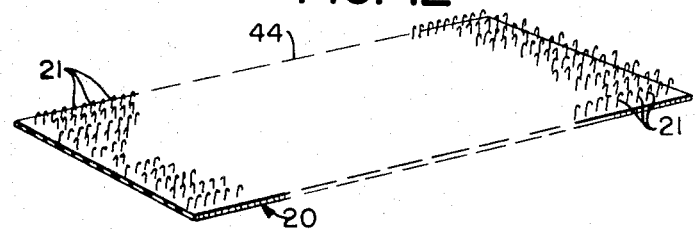
FIG. 12 is a perspective view of the product.

Referring first to FIG. 12 reference numeral 20 designates a short section of a base member in the form of a continuous strip of molded plastic material which is produced by the apparatus of the invention, and projecting from one surface of this strip there are numerous pile-like projections or protuberances in the form of hooks 21. These hooks are integral with and project approximately one-sixteenth inch from the surface of strip 20.

The machine for producing this molded plastic product is illustrated in the remaining figures of the drawings. The machine is built around a main shaft 22 (FIG. 3) which projects to the right from a supporting roller bearing 23 the outer race of which is mounted in a part 24 which projects from the main frame 25. Shaft 22 further supported by a bearing not shown within frame 25. A suitable driving mechanism for rotating shaft 22 at the desired speed is associated with this same housing.

Figure 2:
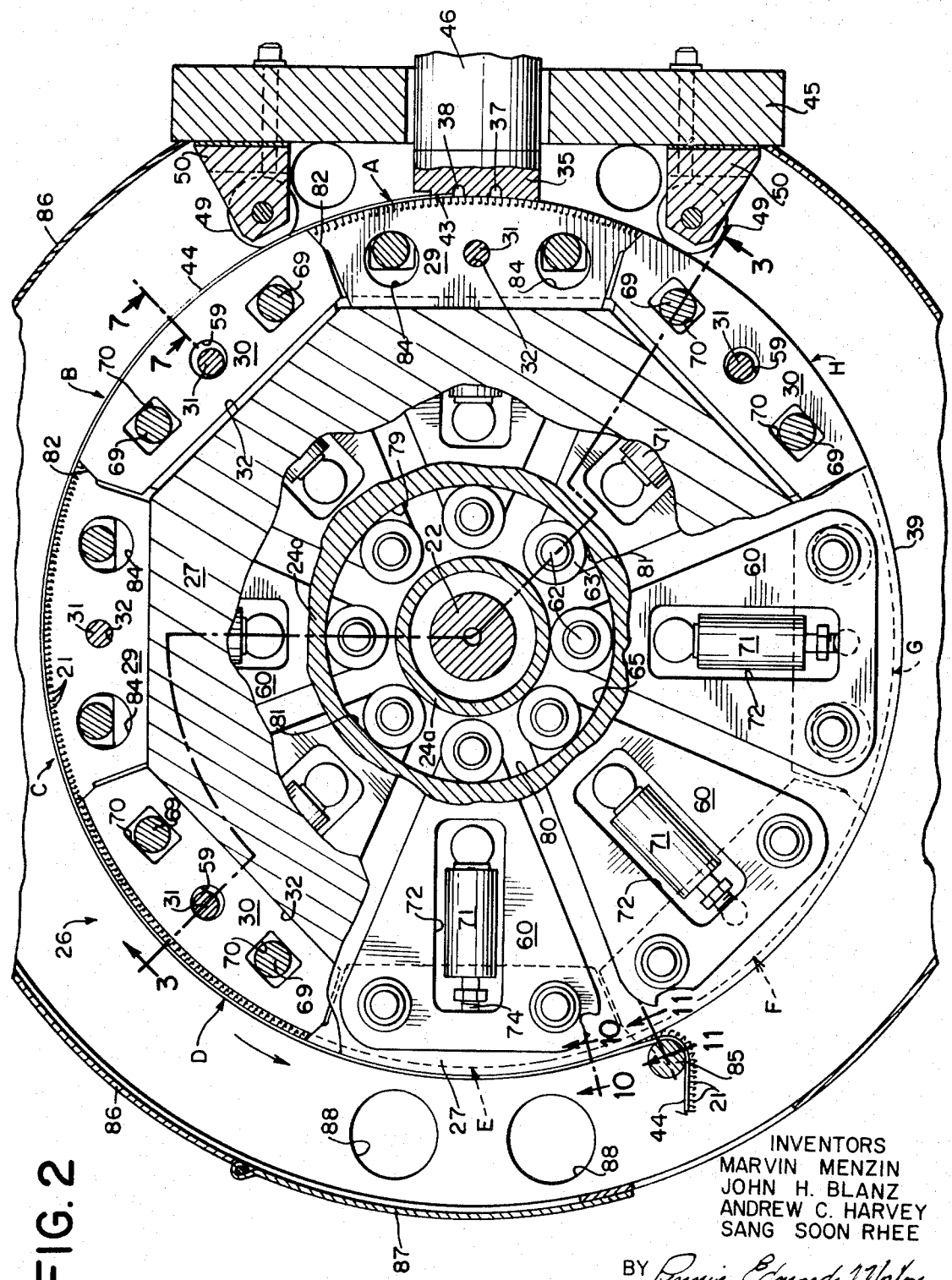
FIG. 2 is an enlarged transverse section of the molding wheel taken along irregular line 2—2 of FIG. 3 with parts broken away to show the different positions of the spacer plate shifters.
Figure 3:
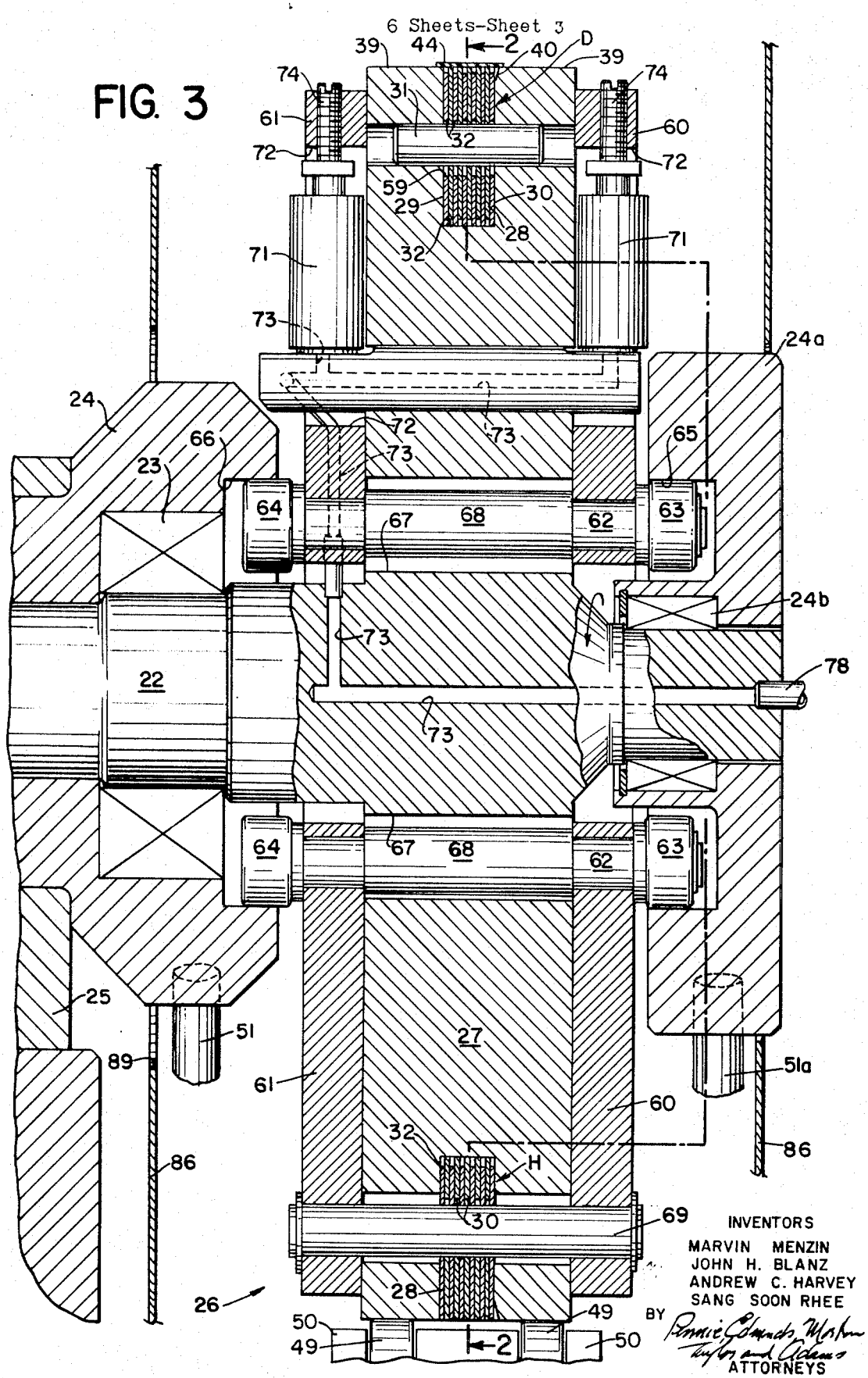
FIG. 3 is a longitudinal section of the molding wheel taken along irregular line 3—3 of FIG. 2.

A mold wheel indicated generally by numeral 26 is arranged on the overhanging portion of shaft 22 projecting to the right of bearing 23. The supporting member of the various components of mold wheel 26 is a thick circular disc 27 (FIGS. 2 and 3) which is made an integral part of shaft 22 as by welding. Disc 27 has at the center of its periphery a continuous groove 28 to receive the several (in this case eight) groups of assembled mold and spacer plates. A group of the mold plates 29 with spacer plates 30 arranged alternately between them is shown at the top of FIG. 3 and another similar group at the bottom. There are eight of these groups of associated mold and spacer plates designated by the letters A through H in FIG. 2 and arranged around the periphery of mold wheel 26 and disc 27. The group of plates are approximately in end to end relationship in groove 28 with the arcuate surfaces of the mold and spacer plates forming a cylindrical surface which is continuous with the cylindrical surfaces 39 of disc 27 on each side of the groove.

The side walls of groove 28 perform a sidewise positioning function with respect to groups A–H of the mold and spacer plates. The depth of groove 28 is arranged to allow the spacer plates of each group to be shifted radially with respect to their companion mold plates and will be more fully described later on. The mold plates 29 of each of these groups are positioned in a circumferential direction by means of a pin 31 which closely fits the respective apertures 32 in the mold plates (FIGS. 2 and 3). As shown in FIG. 2 the bottom surface of groove 28 is octagonal in shape and the groups A–H of mold plates 29 are positioned in the radial direction by the respective bottom surfaces 32 of this octagonal bottom.

The mold plates 29 of each of groups A–H of the mold and spacer plates have mold cavities on their opposite sides (FIG. 7) and these cavities as shown in FIG. 8 are in the form of hooks so as to mold the hook-like protuberances or projections 21 shown in FIG. 12.

Figure 4:
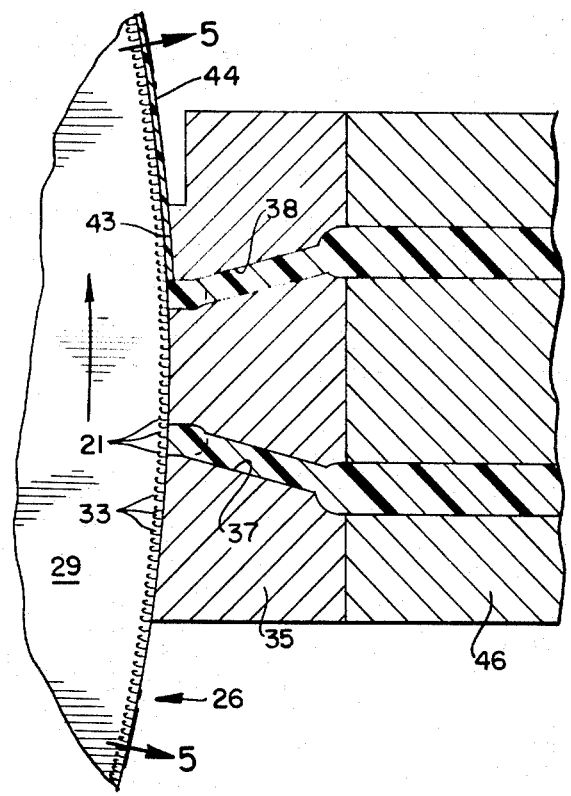
FIG. 4 is a greatly enlarged section of a portion of the molding wheel and of the head of the extruder.
Figure 5:
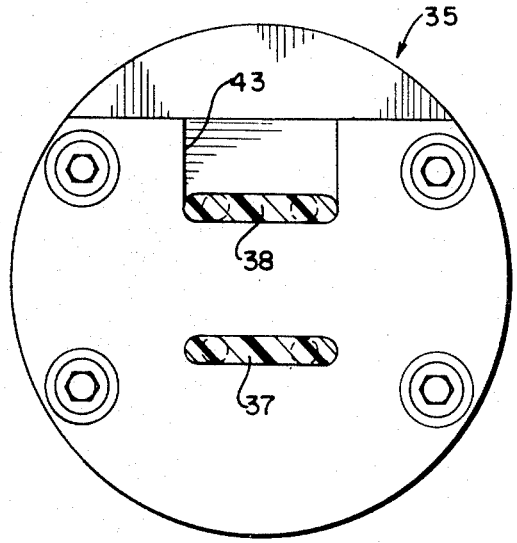
FIG. 5 is a section taken along line 5—5 of FIG. 4.

Group A of the mold and spacer plates (FIG. 2) is moving slowly in the counter-clockwise direction and in operative relation to the die 35 of an extruder 36 for a suitable moldable plastic material. This material moves under pressure through die 35 in two feed passages 37 and 38 (FIG. 4). Spacer plates 30 (FIG. 7) are in their outward position so that their arcuate surfaces are continuous with one another from group to group around the mold wheel and also are continuous with the arcuate surfaces of mold plates 29 and with the marginal cylindrical portions 39 of disc 27 on the opposite sides of groove 28 (FIG. 3).

Figure 6:
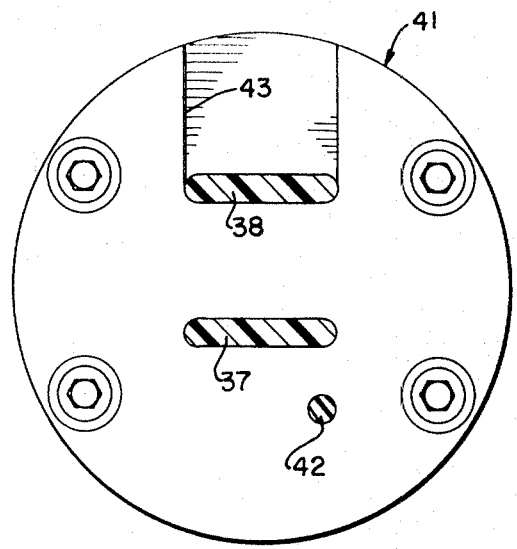
FIG. 6 is a view similar to FIG. 5 showing a modified form of extruder nozzle.
Figure 10:
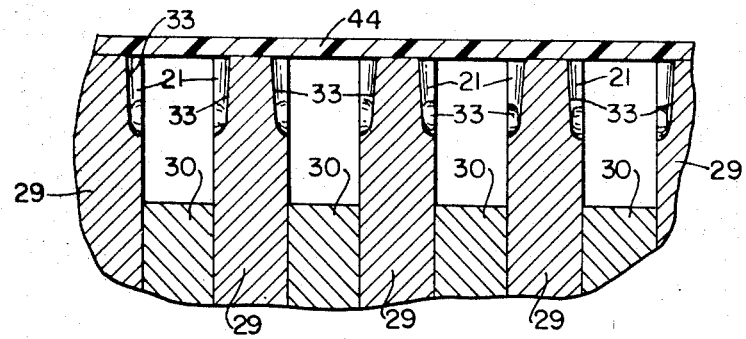
FIG. 10 is a greatly enlarged fragmentary section taken on line 10—10 of FIG. 2 prior to the separation of the hooks from the mold plates and with the spacer plates retracted.
Figure 11:
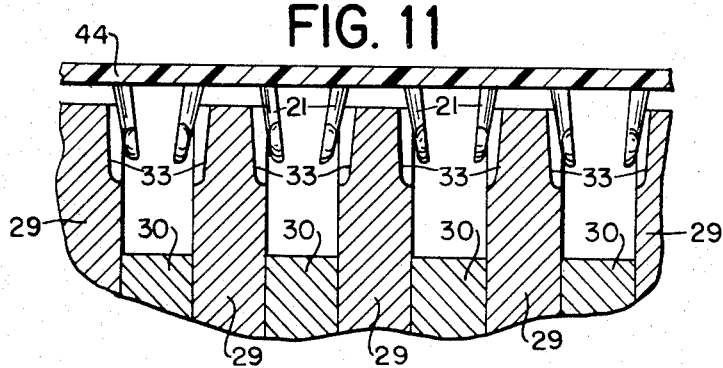
FIG. 11 is a section taken on line 11—11 of FIG. 2 showing the hooks partially disengaged from the mold plate cavities.

In order to prevent "flashing" that is, thin pieces of plastic projecting from the surfaces of the molded protuberances 21 the mold and spacer plates are prevented in any convenient manner from moving apart. One way of preventing these plates from moving apart is to provide a gap or chamber 40 at the right of group B shown in FIG. 7 to extend in a circumferential direction and somwhat below the bottoms of mold cavities 33 and 34. As each group of mold and spacer plates moves opposite the opening of passages 37 the plastic material enters the peripheral chamber 40 and exerts a sidewise pressure to prevent the plates of that group from moving apart. Such pressure will dissipate upon setting of the plastic material. In the modified form of extruder die 41 (FIG. 6) an additional passage 42 for plastic material is provided in advance of passage 37 and in line with peripheral chamber 40 (FIG. 7).

Considerable flexibility is provided by having the two extruder passages; passage 37 will inject plastic material under high pressure from pump 37a while the spacing of passage 38 from the mold to form portion 43 and the extrusion therefrom at lower pressure permits the drawing of ribbon 44.

It is possible for a single extruder passage to be used for supplying a moldable substance to the mold cavities and for forming the strip, however, the use of two extruder passages and of separate pumps for each passage has the attendant advantages mentioned.

Figure 1:
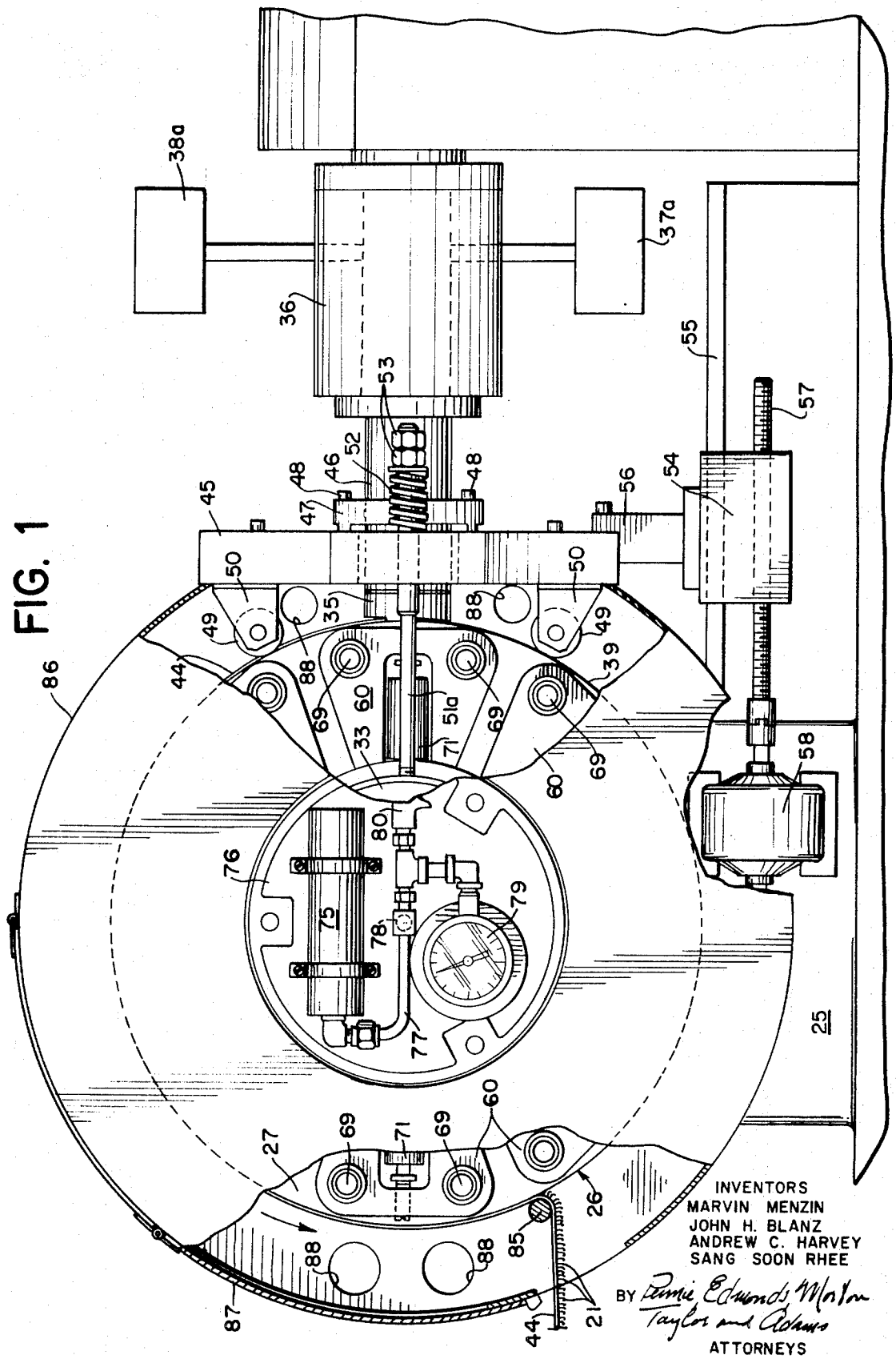
FIG. 1 is a side elevation of the apparatus with parts broken away for clarity of illustration.

Returning to the apparatus and to FIG. 1 it is important that the extruder die head 35 be maintained in the correct radial position with respect to mold wheel 26, that is, the cylindrical marginal surfaces 39 of the disc 27. With this object in view a rigid cross bar 45 is mounted crosswise of the extruder barrel 46 in fixed but adjustable position near the head 35. The adjustment is length-wise of the extruder barrel and for this purpose a member 47, which has a horizontal opening through which barrel 46 passes is welded or otherwise permanently secured to barrel 46. Screws 48, four in number, turn in apertures in member 47 and are received in threaded recesses in cross-bar 45, and give the limited adjusting movement desired.

Near each end of cross bar 45 there is a roller 49 mounted for rotation in a bracket 50 projecting from the left-hand face to bar 45. Rollers 49 rest on the peripheral cylindrical surfaces 39 of disc 27 of mold wheel 21. In order to urge the extruder head 35 in a direction towards the mold wheel 26 two rods 51 and 51a (FIG. 3), one at each side of the mold wheel, are arranged parallel to the axis of the extruder barrel 46. At its left end rod 51 is in threaded engagement with an aperture in part 24 of the main frame 25 of the apparatus. Rod 51a similarly engages a heavy circular member 24a, which is supported by a roller bearing 24b on a reduced end portion of main shaft 22. Member 24a is held stationary by a suitable base connection (not shown).

Rods 51 and 51a pass freely through apertures provided in crossbar 45 on each side of the extruder and on the right-hand end portion of each rod there is a compression coil spring 52 and a pair of adjusting nuts 53. These springs serve to maintain rollers 49 in constant engagement with the cylindrical surfaces 39 of disc 27 during the rotation of mold wheel 26. When the rollers are in such engagement, the extruder head 35 will be spaced properly with respect to the mold wheel.

Under certain circumstances it is desirable to shift the extruder die head 35 away from its operative position with respect to mold wheel 26. This is accomplished by means of a slide 54 which moves on a rail 55 and is connected by bracket 56 to crossbar 45. Slide 54 is engaged by an elongated motor driven screw 57 rotated by a motor 58.

With this arrangement the extruder die head 35 can be quickly shifted away from the mold wheel 26 and just as quickly shifted back into position, and the rollers 50 will cause the surface of the extruder head to be correctly positioned with respect to the surface of the mold wheel.

Referring now to the radial movement of spacer plates 30 and the maintenance of these plates and mold plates 29 in the eight groups A through H inclusive, although pins 31 fit the apertures in the mold plates 29, the spacer plates 30 have apertures 59 surrounding pins 31 which are larger in diameter than the pins so as to permit the desired radial movement of the spacer plates. Mold plates 29 of each group A–H are mounted, as previously explained, in immovable position with their arcuate edges conforming to the cylindrical marginal surfaces 39 of disc 27 of mold wheel 26.

The several spacer plates 30 for each of the groups A–H are moved radially outwardly and inwardly by means of a pair of follower plates 60 and 61 (FIGS. 2 and 3). These are similar plate-like elements triangular in shape with rounded corners as viewed in FIGS. 1 and 2. Plates 60 and 61 are in sliding engagement with the opposite surfaces of disc 27.

Fixed at the inner and narrow ends of each pair of plates 60 and 61 there is a shfat 62 on the outer ends of which are rollers 63 and 64 which engage the surfaces of internal cam surfaces 65 and 66 respectively (FIG. 3). Cam surface 65 is an internal cam formed on the stationary heavy circular member 24a, whereas cam surface 66 is an internal cam provided on part 24 which projects from main frame 25. Shaft 62 extends through an opening 67 in thick supporting disc 27, such opening being sufficiently large to permit the necessary radial movement of shaft 62 to effect the shifting of the spacer plates 30. On shaft 62 there is a sleeve 68 the ends of which maintain the inner portions of follower plates 60 and 61 in spaced relation to each other and permit their sliding movement on the side surfaces of disc 27.

At their outer ends the follower plates 60 and 61 are interconnected by two shafts 69 (FIG. 2) which are spaced apart conformably to the arcuate length of the mold and spacer members 29 and 30 of each group A–H. Shafts 69 closely engage the opposite edges of rectangular apertures 70 in each spacer plate 30. Thus, spacer plates 30 are held in fixed position with respect to the follower plates 60 and 61, and, when these are in their outward position, to be described, the arcuate surfaces of the spacer plates are precisely aligned with the arcuate surfaces of the mold plates 29.

Each of the follower plates 60 and 61 of each pair has a hydraulic cylinder 71 arranged in a rectangular opening 72 therein. The inner end of each cylinder 71 is open to receive the hydraulic fluid and is held in fluid-tight engagement with a supply duct 73 (FIG. 3) for this fluid by means of a screw 74 at the outer end of the cylinder which is in threaded engagement with an opening in the outer portion of the shifter element.

The eight pairs of spacer plate shifter elements 60 and 61 may be held in their outward radial position by any convenient means. As shown, hydraulic pressure is applied to cylinders 71 for this purpose. This hydraulic pressure is provided by means of hydraulic fluid in an accumulator or reservoir 75. This accumulator is mounted on a circular plate 76 (FIG. 1) which is supported in any convenient manner (not shown) at the right of heavy circular disc 24a (FIG. 3). The hydraulic fluid from accumulator 75 is connected with the duct system 73 which includes all of the pressure cylinders 71 of the eight groups A–H by means of tubing 77 and 78 shown in FIG. 1. Also connected to this tubing system is a pressure gauge 79 and a filling connection 80.

The shape or outline of the two internal cams 65 and 66 are identical and one of them is shown in FIG. 2. The purpose of the hydraulic cylinders 71 is to move the pair of follower plates 60 and 61 for each group outwardly prior to and during the time that the groups of molding and spacer plates are passing the die 35 of the extruder. The spacer plates are maintained in their outward position by the hydraulic pressure acting in cylinders 71 for a sufficient time after the extruding and molding operation has been completed to allow the plastic material of the base member or strip 20 and the protuberant elements or hooks 21 to set. Accordingly, the internal surfaces of cams 65 and 66 have two semicircular sections 79 and 80 interconnected by two shifting surfaces 81 disposed diametrically opposite one another and in the approximate angular positions shown in FIG. 2.

The spacer plate shifting elements 60 and 61 are guided by the ends of the spacer plates mounted thereon during the inward and outward radial shifting movement. This may be seen by referring to FIG. 2, Group B where the opposite end edges of spacer plates 30 are indicated by numerals 82. These edges are parallel with each other and with the radius passing through pin 31. The edges 82 lie in contact with similar edges 83 (FIG. 9) of the neighboring mold plates 29. To allow the radial movement of the shafts 69 for the spacer plates 30 of each group, large circular openings 84 are provided in the mold plates 29.

The continuous strip 44 with the molded protuberances 21 thereon are directed outwardly around a take-off rod or roller 85 (FIGS. 1 and 2) and taken up in a coil (not shown) or otherwise stored.

During the entire operation the various parts of the apparatus are to be maintained at the proper temperature, and for this purpose a hood 86 of sheet metal is arranged to enclose the apparatus. A swinging door 87 may be provided adjacent the take-off roller 85 as an outlet for the plastic product. The temperature within hood 86 is maintained by a flow of temperature controlled air through four inlet ducts 88 (FIG. 2). The air flows out through an annular opening 86 (FIG. 3) around the periphery of member 24.

Figure 13:
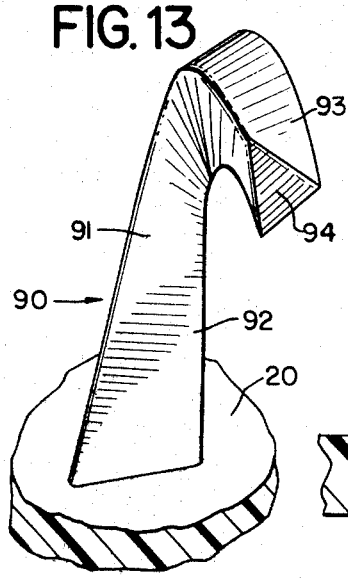
FIG. 13 shows in perspective a modified form of hook element and the adjacent portion of the base on which it is mounted.
Figure 14:
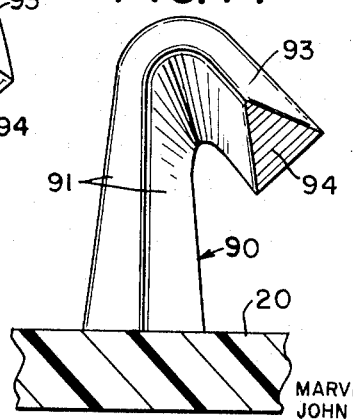
FIGS. 14 and 15 are two elevational views of the modified hook element.
Figure 15:
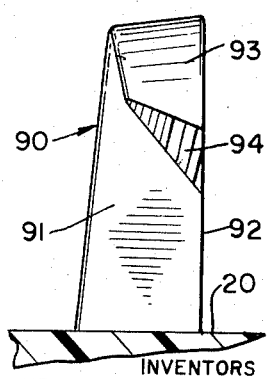

Mold cavities 33 and 34 produce hook elements 21 which have rounded surfaces, whereas FIGS. 13, 14 and 15 illustrate a modified form or forms in which the hook "eye" has a sloping surface 94 and its end which functions as a cam surface during the extracting of the hooks from the mold cavities. When the hook is pulled radially outward by the connecting web 44 (FIG. 2) (which is drawn off the molding wheel surface) this cam surface causes the hook to be expelled from its molding cavity into the clearance provided by the shifting of the adjacent spacer plate, thus freeing the eye of the hook from the cavity.

In FIGS. 13, 14 and 15 the shank portion 90 has two equally dimensioned flat sides 91 and a somewhat larger third side 92. Shank portion 90 is larger in cross section near the web 20 than at the tip of the hook so as to facilitate filling the mold cavity. The three flat side portions facilitate the release of the molded hook from the cavity. The three flat side portions of the shank are continued in smooth curves into and throughout the hook portion 93. The shank portion of the third side 92 lies in the same continuous plane as the corresponding face of hook portion 93 as may be seen in FIG. 15. In addition the hook portions 93 are disposed at a smaller angle to the axis of the shank portion 90 than in the case with the hook members formed in mold cavities 33 and 34 as is indicated in FIG. 8.

It will be understood that objects having various forms other than the hook members particularly illustrated in FIGS. 13-15 may be produced according to the method and apparatus of the invention. For example the continuous production of a plurality of objects is possible each object being attached to a common strip which serves as a carrier and common connection of the objects. Furthermore, it is obvious that the invention lends itself to producing different shapes of molded protuberances formed as a pile and integrally attached to a backing strip. Such protuberances may, for example, comprise a multiplicity of loops to form one part of a hook and loop type fastener; or may comprise differently shaped hooking elements than are specifically illustrated herein.

Accordingly, it will be apparent to those skilled in the art that the foregoing has described a particular embodiment or embodiments of the invention and is merely representative. Therefore, in order to appreciate more fully the spirit and scope of the invention, reference should be made to the appended claims.

We claim:

1. An apparatus for producing a continuous strip of a molded plastic product comprising a plurality of groups of mold plates having similar arcuate edges and having mold cavities intersecting these edges and one face of the mold plate, the mold plates of each group being separated from one another by flat spacer plates, said groups being arranged substantially end to end with their arcuate edges forming the rotary cylindrical surface of a mold wheel, means for positioning said groups of mold plates allowing the spacer plates of each group to be shifted radially with respect to the mold plates of such group, the spacer plates when in their outward positions having their arcuate edges continuous with the arcuate edges of the mold plates, the flat faces of said spacer plates forming one wall of each of the mold cavities, an extruder having a die whose surface is disposed close to said rotary cylindrical surface for delivering moldable plastic material to said mold cavities to form upstanding members and also to said surface to form therewith a plastic base member strip to which the upstanding members formed in the mold cavities are integrally attached, and means for shifting the spacer plates after the plastic material has set so as to release the sides of the upstanding members and allow them to be freed from the mold cavities.

2. An apparatus for producing a continuous strip of a molded plastic product comprising a plurality of groups of mold plates having similar arcuate edges and having mold cavities intersecting these edges and one face of the mold plate, the mold plates of each group being separated from one another by flat spacer plates, said groups being arranged substantially end to end with their arcuate edges forming a rotary cylindrical surface, means for positioning said groups of mold plates allowing the spacer plates of each group to be shifted radially with respect to the mold plates of such group, the spacer plates when in their outward positions having their arcuate edges continuous with the arcuate edges of the mold plates, the flat faces of said spacer plates forming one wall of each of the mold cavities, means for delivering under pressure to said mold cavities to form upstanding members, moldable plastic material of a particular composition, means for delivering under pressure moldable plastic material of a different composition to said rotary cylindrical surface to form thereon a plastic base member strip to which the upstanding members formed in the mold cavities are integrally attached, and means for shifting the spacer plates after the plastic material in the mold cavities has set to release the sides of the upstanding members and allow them to be freed from the mold cavities.

3. An apparatus for producing a continuous molded plastic product as set forth in claim 2 in which the moldable plastic material delivered to the mold cavities produces upstanding members which are more flexible than the material of the plastic base member.

4. Apparatus for producing a continuous strip of a molded plastic product as set forth in claim 1 in which the means for positioning the groups of mold and spacer plates comprises a rotary shaft, a rigid circular member having a cylindrical face and mounted for rotation with said shaft said member having a peripheral groove in its face, said mold and spacer plate groups being disposed within said groove and in contacting end to end relation with one another, and their arcuate edges being even with cylindrical surfaces of said face on the opposite side of said groove.

5. Apparatus for producing a continuous strip of a molded product as set forth in claim 1 in which the extruder die has two orifices, one for delivering moldable plastic material to the mold cavities and molding therein upstanding members and the second for forming a continuous plastic strip of predetermined thickness integrally attached to said upstanding members.

6. Apparatus for producing a continuous strip of a molded plastic product as set forth in claim 4 wherein the extruder die has a cylindrical surface portion slightly spaced from and parallel with the cylindrical surface formed by the groups of mold and spacer plates and constituting a space to receive the plastic material from the second extruding orifice and thus form the plastic strip.

7. Apparatus for producing a continuous strip of molded plastic product as set forth in claim 4 in which the plate at one side of each of said groups of mold and spacer plates has a circumferential recess, said recess receiving moldable plastic material under the extruder pressure and maintaining the series of spacer and mold plates in contact with one another thereby to prevent the formation of flashing between the mold and spacer plates.

8. Apparatus for producing a continuous strip of molded plastic product as set forth in claim 7 in which the extruder die is provided with a third orifice arranged in advance of the first and second orifice for supplying plastic material under the extruder pressure to said circumferential recess.

9. An apparatus for producing a continuous strip of a molded product as set forth in claim 4 wherein a cross bar is mounted adjacent the extruder head having portions extending in the plane of said mold wheel and a roller is supported by each such portion of the cross bar to operate on the surface of said mold wheel, together with resilient means for maintaining said rollers in contact with said mold wheel so as to properly position the face of the extruder die head with respect to the surface of the mold wheel.

10. Apparatus for producing a continuous strip of molded plastic product as set forth in claim 1 in which the means for shifting the spacer plates comprises for each group a pair of shifting elements in contact respectively with the outer surfaces of said mold wheel, said shifting elements being interconnected near their outer edges by two shafts passing through closely fitting apertures in the spacer plates and arranged to move freely in larger apertures in the mold plates, said shifting elements of each pair being connected at their inner ends by means of a shaft having a roller at each end, a stationary cam operatively associated with each of said rollers, and resilient means associated with each of said pairs of shifting elements urging them outwardly against the action of said cam.

11. Apparatus for producing a continuous strip of a molded plastic product as set forth in claim 10 in which said resilient means comprises hydraulic pressure means associated with each of said pairs of shifting elements to urge them outwardly against the action of said cam.

12. An apparatus for producing a continuous molded plastic product having a base member and at least one other member upstanding from the base member and integrally formed therewith comprising:

a. a plurality of groups of mold plates disposed in contacting and substantially surface-to-surface relationship, said groups being arranged in substantially end-to-end relationship forming an endless closed configuration, each mold plate being defined by two flat faces on opposite sides of the mold plates, at least one of said mold plates of each group having at least one mold cavity in at least one of its flat faces, each mold cavity being disposed in intersecting relationship with respect to an edge portion of its respective mold plate, at least one flat face of alternately positioned mold plates forming a wall of each mold cavity in a remaining mold plate;

b. means for mounting said alternate mold plates of each group for sliding movement relative to the remaining mold plates of such group between a first position where the said edge portions of the alternate and remaining mold plates of each group are disposed in substantially flush relationship forming a coextensive molding surface and a second position where each mold cavity is exposed to permit release of the molded form disposed in such exposed cavity, said sliding movement being in a direction generally parallel to the plane of said flat faces in a plane intersecting said molding surface;

c. supply means for delivering moldable plastic material under pressure into each mold cavity to form therein the upstanding member and onto said coextensive molding surface to form thereon the base member with which the upstanding member formed in the mold cavity is integrally formed, said supply means and said groups of mold plates being mounted for relative movement with respect to each other along a substantially closed path of travel;

d. drive means for moving said alternate mold plates from said first position to said second position to release the upstanding member from the mold cavity after said moldable plastic material has sufficiently set and for returning said alternate mold plates to said first position after release; and e. means for separating the molded product from the molding surface after said alternate mold plates have been moved to the second positon.

13. An apparatus for producing a continuous strip of a molded plastic product having a base member and at least one other member upstanding from the base member and integrally formed therewith comprising:

a. a plurality of groups of mold plates disposed in contacting and substantially surface-to-surface relationship, said groups being arranged in substantially end-to-end relationship, each mold plate being defined at least partially by an arcuate edge and two flat faces on opposite sides of the mold plate, at least one of said mold plates of each group having at least one mold cavity in at least one of its flat faces, each mold cavity being disposed in intersecting relationship with respect to an arcuate edge portion of its respective mold plate, at least one flat face of alternately positioned mold plates forming a wall of each mold cavity in a remaining mold plate;

b. means for mounting said alternate mold plates of each group for sliding movement relative to the remaining mold plates of such group in a radial direction generally parallel to the plane of said flat faces between a first position where the said arcuate edge portions of the alternate and remaining mold plates of each group are disposed in substantially flush relationship forming a coextensive cylindrical molding surface and a second position where each mold cavity is exposed to permit release of the molded form disposed in such exposed cavity;

c. supply means for delivering moldable plastic material under pressure into each mold cavity to form therein the upstanding member and onto said coextensive cylindrical molding surface to form thereon the base member in the form of a strip with which the upstanding member formed in the mold cavity is integrally formed, said supply means and said groups of mold plates being mounted for relative movement with respect to each other along a substantially closed path;

d. drive means for moving said alternate mold plates from said first position to said second position to release the upstanding members from the mold cavities after said moldable plastic material has sufficiently set and for returning said alternate mold plates to said first position after release; and e. means for separating the molded product from the molding surface after said alternate mold plates have been moved to said second position.

14. An apparatus for producing a continuous molded plastic product having a base member and at least one other member upstanding from the base member and integrally formed therewith comprising:

a. a plurality of groups of mold plates disposed in contacting and substantially surface-to-surface relationship, said groups being arranged in substantially end-to-end relationship forming an endless closed configuration with the mold plates of each group comprising alternate substantially flat spacer plates, each mold plate being defined by two flat faces on opposite sides of the mold plate, at least one of said mold plates of each group having at least one mold cavity in at least one of its flat faces, each mold cavity being disposed in intersecting relationship with respect to an edge portion of its respective mold plate, at least one flat face of said spacer plates formed a wall of each mold cavity in an adjacent mold plate;

b. means for mounting said spacer plates in each group for sliding movement relative to the mold plates of such group between a first position where the said edge portions of the spacer and mold plates of each group are disposed in substantially flush relationship forming a coextensive molding surface and a second position where each mold cavity is exposed to permit release of the molded form disposed in such exposed cavity, said sliding movement being in a direction generally parallel to the plane of said flat faces in a plane intersecting said molding surface;

c. supply means for delivering moldable plastic material under pressure into each mold cavity to form therein the upstanding member and onto said coextensive molding surface to form thereon the base member with which the upstanding member formed in the mold cavity is integrally attached, said supply means and said groups of mold plates being mounted for relative movement with respect to each other along a substantially closed path;

d. drive means for moving said alternate mold plates from said first position to said second position to release the upstanding members from the mold cavities after the moldable plastic material has sufficiently set and returning said alternate mold plates to said first position after release; and e. means for separating the molded product from the molded surface after said alternate mold plates have been moved, to said seocnd position.

15. Apparatus for producing a continuous strip of a molded plastic product having a base member of at least one other member upstanding from the base member and integrally formed therewith comprising:

a. a plurality of groups of mold plates disposed in contacting and substantially surface-to-surface relationship, said groups being arranged in substantially end-to-end relationship with the alternate mold plates of each group comprising substantially flat spacer plates, each mold plate being defined at least partially by an arcuate edge and two flat faces on opposite sides of the mold plate, at least one of said mold plates of each group having at least one mold cavity in at least one of its flat faces, each mold cavity being disposed in intersecting relationship with respect to an arcuate edge portion of its respective mold plate, at least one flat face of said spacer plates forming a wall of each mold cavity in an adjacent mold plate;

b. means for mounting said alternate mold plates of each group for sliding movement relative to the remaining mold plates of such group in a radial direction generally parallel to the plane of said flat faces between a first position where the said arcuate edge portions of the spacer and mold plates of each group are disposed in substantially flush relationship forming a coextensive cylindrical molding surface and a second position where each mold cavity is exposed to permit release of the molded form disposed in such exposed cavity;

c. supply means for delivering moldable plastic material under pressure into each mold cavity to form therein the upstanding member and onto said coextensive cylindrical molding surface to form thereon the base member in the form of a strip with which the upstanding member formed in each mold cavity is integrally formed, said supply means and said groups of mold plates being mounted for movement relative to each other along a substantially closed path;

d. drive means for moving said alternate mold plates from said first position to said second position to release the upstanding members from the mold cavities after the moldable plastic material has sufficiently set and returning said alternate mold plates to said first position after release; and e. means for separating the molded product from the molding surface after said alternate mold plates have been moved to said second position.

16. Apparatus for producing a molded plastic product having a base member and at least one other member upstanding from the base member and integrally formed therewith comprising:

a. a plurality of groups of mold plates, said groups being disposed in substantially end-to-end relationship forming an endless closed configuration, each group including at least one pair of mold plates disposed in contacting and substantially surface-to-surface relationship;

b. at least one mold cavity formed in each pair of mold plates, each cavity lying generally along the interfacial plane of contact between the mold plates of such pair and in intersecting relationship to adjacent edge protions of such pair, each mold cavity being defined in part by a recessed portion formed in at least one of the contacting surfaces of such pair and in part by that portion of the other contacting surface of such pair which lies in juxtaposition to said recessed portion;

c. means for mounting each pair of mold plates for sliding movement relative to each other between a first position where said adjacent portions of such pair are disposed in substantially flush relationship forming a coestensive molding surface and a second position where said adjacent edge portions are offset relative to each other by a distance sufficient to expose that portion of each mold cavity defined by one of said contacting surfaces of such pair thereby permitting release of the molded form disposed in the mold cavity, said sliding movement being in a direction generally parallel to the interfacial plane of contact between the mold plates of such pair in a plane intersecting said molding surface;

d. supply means for delivering moldable plastic material under pressure into each mold cavity to form therein the upstanding member and onto said coextensive molding surface to form thereon the base member with which the upstanding member formed in each mold cavity is integrally formed, said supply means and said groups of mold plates being mounted for relative movement with respect to each other along a substantially closed path; and e. drive means for moving the mold plates of each pair from said first position to said second position to permit release of each upstanding member from its mold cavity after the moldable plastic material has sufficiently set and for returning said mold plates to the first position after release;

f. means for separating the molded product from the molding surface after the mold plates have been moved to the second position.

17. Apparatus according to claim 16 wherein the juxtapositioned portion of said other contacting surface of each pair is substantially flat.

18. Apparatus according to claim 17 wherein said adjacent edge portions of the mold plates of each pair are substantially arcuate in shape thereby defining a coextensive cylindrical molding surface when said adjacent edge portions are in said second position.

19. Apparatus according to claim 18 wherein:
a. the supply means is mounted in a stationary postiion; and
b. said groups of mold plates are moved in a circular path closely adjacent to the stationary supply means.

20. Apparatus according to claim 19 wherein:
a. the mold plate of each pair having the recessed mold cavity defining portion is held in a stationary position; and
b. the other mold plate of each pair is moved radially inward relative to said stationary mold plate.

21. Apparatus according to claim 20 wherein the supply means includes:
a. a first extrusion orifice for delivering moldable plastic material of a perdetermined composition into each mold cavity to form the upstanding members of said molded product; and
b. a second extrusion orifice for delivering moldable plastic material having a composition different from the moldable plastic material delivered by the first extrusion orifice onto said coextensive cylindrical surface to form the base member of said molded product.

* * * * *

UNITED STATES PATENT OFFICE
CERTIFICATE OF CORRECTION

Patent No. 3,752,619      Dated August 14, 1973

Inventor(s) MARVIN MENZIN, ET. AL.

It is certified that error appears in the above-identified patent and that said Letters Patent are hereby corrected as shown below:

Column 2, line 29, insert a period at the end of the sentence. Column 7, line 20, "opening 86" should read -- opening 89 -- . Column 13, claim 16, line 8, "protions" should read -- portions -- .

Signed and sealed this 6th day of August 1974.

(SEAL)
Attest:

McCOY M. GIBSON, JR.
Attesting Officer

C. MARSHALL DANN
Commissioner of Patents